Patented Nov. 9, 1948

2,453,305

UNITED STATES PATENT OFFICE 2,453,305

PROCESS FOR REMOVING FATS FROM RUTIN EXTRACTS

James F. Couch, Glenside, and Charles F. Krewson, Erdenheim, Pa., assignors to the United States of America as represented by the Secretary of Agriculture No Drawing. Application November 25, 1947, Serial No. 788,077

1 Claim. (Cl. 260—210)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the production of rutin and more particularly to a method for removing fat impurities from rutin extracts, and has among its objects purification of the rutin in a simple and efficacious manner.

Rutin occurs in a wide variety of plants and can be isolated from the rutin-bearing plant materials by solvent extraction with such solvents as the alcohols, ketones, and so forth, by known procedures. The crude product thus obtained contains rutin in admixture with fats, the amount of these impurities being from two to three times that of rutin.

Rutin cannot be separated from this extraneous material by crystallization, because the fats are deposited upon and adhere tenaciously to the rutin crystals. Also, solutions of crude rutin cannot be efficiently freed of the fats by ordinary filtration methods, using filter paper or cloth, since the finely divided fat particles rapidly agglomerate on the surface and within the interstices of the filter, thus rendering it impervious to the solution. Clogging of the filter is not prevented by the use of foraminous materials, like kieselguhr or similar substances, commonly utilized to facilitate filtration. If the solution is filtered through a fibrous material for example cotton batting, the material is also plugged by the fat particles and filtration is interrupted.

Fats have been removed from crude rutin by extraction with a selective solvent, for example benzene. This purification step not only increases production costs but presents a health problem and fire hazard due to the nature of the solvents used.

In general, according to the present invention, crude rutin, produced by solvent extraction of green or dried rutin-bearing plant materials, is freed from substantially all impurities by filtering an aqueous solution of the crude extract through a glass fiber filter at a temperature sufficiently high to keep the rutin in solution.

In contradistinction to other fibrous filtering means, glass fibers possess the unique property of retaining the fats present in such solutions without however, resulting in clogging of the filter. When an aqueous solution of crude rutin is caused to flow through a layer of glass fibers, the fat particles adhere to the fibers but do not agglomerate into a compact mass, and hence do not impede free flow of the solution through the filter. The resulting filtrate is substantially free of fats. The small amount of insoluble material not retained by the glass wool filter can then be readily removed from the solution by conventional filtration methods.

The following examples illustrate the invention in greater detail.

Example I

A 1520-pound batch of fresh, green, whole buckwheat plants was covered with approximately 350 gallons of absolute ethanol and allowed to macerate overnight. The alcohol extract was then drawn off, replaced by an equal volume of fresh absolute ethanol and the steeping process continued for about the same length of time. The procedure was repeated and two more extractions were made using recovered, 80 percent by volume, ethanol as the steeping liquid. The first two extracts were combined and evaporated to give a concentrate of approximately 40 gallons.

The concentrate thus obtained could not be filtered either through a filter press or suction filter, and the crude rutin which separated on cooling contained 50 to 75 percent of fats, as shown by extraction of several samples with hot benzene.

The concentrate was then heated to a boil and run from the evaporator through a glass wool filter into a stainless steel tank.

The filter consisted of a wire box about 6 inches deep and 16 inches square made of wire screen of ½-inch mesh (preferably stainless steel avoiding iron). The bottom and sides were covered inside with cheese-cloth and packed with a light layer of glass fiber about ½-inch thick extending up and over the sides.

Substantially all the fat present in the concentrate was retained by the glass wool layer. The fat-free concentrate so obtained was maintained at boiling temperature and filtered through a rack and frame press equipped with 9 sq. feet of canvass-backed paper filter mats (Republic Filter Corp. No. K-5 or its equivalent). The crude rutin crystallized from the filtrate on cooling and was removed. When extracted with hot benzene, it was found to contain only minute traces of fatty material.

Analogous results were obtained when the above-described procedure was applied to the concentrate produced by evaporation of combined third and fourth extracts of the buckwheat plants with the 80 percent ethanol.

*Example II*

A mixture of ten pounds dried buckwheat meal and 30 gallons of 70 percent isopropyl alcohol was stirred for 4½ hours and then allowed to stand overnight. The supernatant liquid was drawn off and the marc pressed to free it of the major portion of absorbed alcohol. The marc was then washed with two five-gallon portions of isopropyl alcohol and pressed after each washing. The extract was combined with the washings and evaporated to 3 gallons. The concentrate thus obtained was similar to that of the foregoing example.

The fats were removed from the concentrate by means of the same type of equipment and following the procedure described in Example I, using several quarts of boiling water to wash the fat residue on the glass wool filter. The fat-free concentrate was then filtered through a Lapp porcelain suction filter equipped with a paper filter mat. The crude crystalline rutin recovered from the filtrate was free of fat impurities.

Using procedures analogous to those described in the foregoing examples, fats were removed from crude rutin concentrates obtained on evaporation of aqueous solvent extracts derived from other rutin-bearing plant material such as tobacco, black chokecherry, forsythia, elder and hydrangea extracted with water-miscible, oxygen-containing rutin solvents such as alcohols like methyl, ethyl, propyl and isopropyl alcohol, and ketones like acetone and methyl ethyl ketone, dioxane and the like.

The fat-free, crude crystalline rutin obtained by the above-described method was converted to rutin of pharmaceutical purity by the following procedure: The crude crystalline rutin was slurried three times with a small amount of cold water, and dried at 110° C. It was then dissolved in boiling water (at a pH not exceeding 6.5) using 20 gallons of water per pound of rutin. The resulting solution was filtered through canvas-backed heavy filtered paper mats, and the filtrate was purified using the method described by Couch, Krewson and Porter in their application for patent, Serial No. 685,632, filed July 23, 1946, by boiling for 15 minutes with silica gel (using ½ pound of silica gel per pound of rutin). It was then filtered while hot. The rutin precipitate which crystallized from the filtrate, on standing, was filtered off and dried to constant weight at 110° C.

Having thus described the invention, what is claimed is:

A process of removing fat impurities from rutin which has been produced by solvent extraction of rutin-bearing plant materials, comprising filtering an aqueous solution of the rutin and the impurities through a glass fiber filter.

JAMES F. COUCH.
CHARLES F. KREWSON.

No references cited.